(12) United States Patent
Kotla et al.

(10) Patent No.: US 9,336,147 B2
(45) Date of Patent: May 10, 2016

(54) CACHE AND MEMORY ALLOCATION FOR VIRTUAL MACHINES

(75) Inventors: Ramakrishna R. Kotla, Sunnyvale, CA (US); Venugopalan Ramasubramanian, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 13/494,017

(22) Filed: Jun. 12, 2012

(65) Prior Publication Data

US 2013/0332676 A1 Dec. 12, 2013

(51) Int. Cl.
*G06F 12/08* (2006.01)
*G06F 9/50* (2006.01)

(52) U.S. Cl.
CPC .......... *G06F 12/0848* (2013.01); *G06F 9/5061* (2013.01); *G06F 12/0895* (2013.01)

(58) Field of Classification Search
CPC . G06F 12/08; G06F 12/0806; G06F 12/0804; G06F 12/10; G06F 12/12; G06F 12/1416; G06F 12/0284; G06F 12/1483; G06F 9/5077; G06F 2212/152; G06F 12/0638; G06F 9/5016; G06F 2212/653; G06F 2212/656; G06F 9/45533
See application file for complete search history.

(56) References Cited

U.S. PATENT DOCUMENTS

| | | | |
|---|---|---|---|
| 5,913,222 A | 6/1999 | Liedtke | |
| 6,009,503 A * | 12/1999 | Liedtke | 711/203 |
| 6,654,859 B2 | 11/2003 | Wooldridge | |
| 7,085,890 B2 | 8/2006 | Kashyap | |
| 7,913,040 B2 | 3/2011 | Beckmann et al. | |
| 2002/0002657 A1 | 1/2002 | Sturges et al. | |
| 2005/0132364 A1 * | 6/2005 | Tewari et al. | 718/1 |
| 2005/0235123 A1 * | 10/2005 | Zimmer et al. | 711/170 |
| 2008/0022048 A1 * | 1/2008 | Baker | 711/130 |
| 2008/0055617 A1 | 3/2008 | Savagaonkar | |
| 2008/0126547 A1 * | 5/2008 | Waldspurger | 709/226 |
| 2008/0313420 A1 * | 12/2008 | Beckmann et al. | 711/207 |
| 2009/0006801 A1 * | 1/2009 | Shultz et al. | 711/170 |
| 2011/0055827 A1 * | 3/2011 | Lin et al. | 718/1 |

OTHER PUBLICATIONS

X.Jin H. Chen, X. Wang, Z. Wang, X. Wen, Y. Luo, X. Li. "A Simple Cache Partitioning Approach in a Virtualized Environment", IEEE International Symposium on Parallel and Distributed Processing with Applications 2009.*

(Continued)

*Primary Examiner* — Kevin Verbrugge
*Assistant Examiner* — Francisco Grullon
(74) *Attorney, Agent, or Firm* — Sandy Swain; Micky Minhas

(57) ABSTRACT

In a cloud computing environment, a cache and a memory are partitioned into "colors". The colors of the cache and the memory are allocated to virtual machines independently of one another. In order to provide cache isolation while allocating the memory and cache in different proportions, some of the colors of the memory are allocated to a virtual machine, but the virtual machine is not permitted to directly access these colors. Instead, when a request is received from the virtual machine for a memory page in one of the non-accessible colors, a hypervisor swaps the requested memory page with a memory page with a color that the virtual machine is permitted to access. The virtual machine is then permitted to access the requested memory page at the new color location.

18 Claims, 6 Drawing Sheets

(56) References Cited

OTHER PUBLICATIONS

H.Raj, R. Nathuji, A. Singh, P. England. "Resource Management for Isolation Enhanced Cloud Services", CCSW'09, Nov. 13, 2009, Chicago, Illinois, USA.*

Zhang, et al., "Towards Practical Page Coloring-based Multi-core Cache Management", Retrieved at <<http://www.cs.rochester.edu/~kshen/papers/eurosys2009.pdf>>, Proceedings of the 4th ACM European conference on Computer systems, Apr. 1, 2009, pp. 89-102.

Raj, et al., "Resource Management for Isolation Enhanced Cloud Services", Retrieved at <<http://www.cs.jhu.edu/~sdoshi/jhuisi650/papers/spimacs/SPIMACS_CD/ccsw/p77.pdf>>,Proceedings of the 2009 ACM workshop on Cloud computing security, Nov. 13, 2009, pp. 77-84.

Jin, et al., "A Simple Cache Partitioning Approach in a Virtualized Environment", Retrieved at << http://ieeexplore.ieee.org/stamp/stamp.jsp?tp=&arnumber=5207888>>, Proceedings of IEEE International Symposium on Parallel and Distributed Processing with Application, Aug. 10, 2009, pp. 519-524.

"Amazon physical hardware and ec2 compute unit", Retrieved at<<http://huanliu.wordpress.com/2010/06/14/amazons-physical-hardware-and-ec2-compute-unit/>>, Jun. 14, 2010, pp. 7.

Cantin, et al., "Cache performance for spec cpu2000 benchmarks", Retrieved at <<http://research.cs.wisc.edu/multifacet/misc/spec2000cache-data/>>, Proceedings of Cache Performance of SPEC CPU2000, May 2003, pp. 12.

Lodge, Mathew, "Getting Rid of Noisy Cloud Neighbours", Retrieved at <<http://blogs.vmware.com/rethinkit/2010/09/getting-rid-of-noisy-cloud-neighbors.html, Sep. 6, 2010, pp. 8.

Barham, et al., "Xen and the art of virtualization", Retrieved at <<http://www.cl.cam.ac.uk/research/srg/netos/papers/2003-xensosp.pdf>>, Proceedings of SOSP, Bolton Landing NY, Oct. 19-22, 2003, pp. 14.

Bugnion, et al., "Compiler-directed page coloring for multiprocessors", Retrieved at <<http://citeseerx.ist.psu.edu/viewdoc/download;jsessionid=9FDA523BC63EF5A0C1FF00AB6FC3ABCB?doi=10.1.1.70.4316&rep=rep1&type=pdf>>, Proceedings of ASPLOS, Cambridge MA, Oct. 1996, pp. 12.

Gulati, et al., "mClock: Handling throughput variability for hypervisor IO scheduling", Retrieved at <<http://static.usenix.org/event/osdi10/tech/full_papers/Gulati.pdf>>, In Proceedings of the 9th USENIX Conference on Operating Systems Design and Implementation, Oct. 4, 2010, pp. 14.

Kessler, et al., "Page placement algorithms for large real-indexed caches", Retrieved at <<http://ftp.cs.wisc.edu/pub/markhill/Papers/tocs92_coloring.pdf>>, Proceedings of ACM Transactions on Computer Systems, vol. 10, No. 4, Nov. 1992, pp. 22.

Lu, et al., "Virtual machine memory access tracing with hypervisor exclusive cache", Retrieved at <<http://www.vmware.com/files/pdf/usenix07.pdf>>, Proceedings of Usenix ATC, 2007, pp. 3:1-3:15.

Ristenpart, et al., "Hey, you, get off of my cloud: Exploring information leakage in third-party compute clouds", Retrieved at <<http://www.cs.tau.ac.il/~tromer/papers/cloudsec.pdf>>, In Proceedings of CCS, Chicago IL, Nov. 9-13, 2009, pp. 14.

Rosenblum, et al., "Virtual machine monitors: current technology and future trends", Retrieved at <<http://www.arion.csd.uwo.ca/courses/CS843a/papers/intro-vm.pdf>>, Proceedings of IEEE Computer, 38(5), May 2005, pp. 39-47.

Schad, et al., "Runtime measurements in the cloud: Observing, analyzing, and reducing variance", Retrieved at <<http://infosys.uni-saarland.de/publications/SDQ10.pdf>>, Proceedings of VLDB, vol. 3, No. 1, Sep. 2010, pp. 12.

Shieh, et al., "A. Shieh, S. Kandula, A. Greenberg, and C. Kim. Seawall: performance isolation for cloud datacenter networks", Retrieved at <<http://static.usenix.org/events/hotcloud10/tech/full_papers/Shieh.pdf>>, Proceedings of HotCloud, 2010, p. 1.

Tromer, et al., "Efficient Cache Attacks on AES, and Countermeasures", Retrieved at <<http://cs.tau.ac.il/~tromer/papers/cache-joc-official.pdf>>, In Journal of Cryptography, Jul. 23, 2009, pp. 35.

Waldspurger, Carl, A., "Memory resource management in vmware esx server", Retrieved at <<http://www.waldspurger.org/carl/papers/esx-mem-osdi02.pdf>>, In Proceedings of Fifth Symposium on Operating Systems Design and Inplementation (OSDI, 2002), Dec. 2002, pp. 14.

Zhnag, et al., "Towards practical page coloring-based multicore cache management", Retrieved at <<http://www.cs.rochester.edu/~kshen/papers/eurosys2009.pdf>>, In proceedings of Eurosys, Nuremberg, Germany, Apr. 1-3, 2009, pp. 14.

"Amazon Elastic Compute Cloud (Amazon EC2)", Retrieved at <<http://aws.amazon.com/ec2/>, Retrieved Date: Jul. 6, 2012, pp. 20.

"Windows Azure", Retrieved at <<http://www.windowsazure.com/en-us/>>, Retrieved Date: Jul. 6, 2012, pp. 4.

Warren, Christina, "Microsoft and eBay Team Up for Cloud Computing Bliss", Retrieved at <<http://mashable.com/2010/07/12/microsoft-windows-azure-platform-appliance/>>, Jul. 12, 2010, pp. 8.

"Netflix and Amazon and the Cloud", Retrieved at <<http://integracon.wordpress.com/2010/04/19/netflix-and-amazon-and-the-cloud/>>, Apr. 19, 2010, pp. 4.

* cited by examiner

CACHE AND MEMORY ALLOCATION FOR VIRTUAL MACHINES

BACKGROUND

Cloud computing provides an economical, flexible, and scalable platform to deploy information technology (IT) services. It enables cloud customers to rent computing infrastructure on demand, scale up or down hardware resources elastically as needs change, and pay only for the resources consumed. Cloud platforms provide these benefits through efficient multiplexing and management of resources, attracting many customers to outsource their services to the cloud.

An enabler of cloud computing is virtualization technology. It provides flexible allocation of various resources, enforces isolation between applications sharing resources, and migrates applications transparently to tolerate failures and to harness under-utilized resources. Researchers have explored mechanisms to isolate and share key resources such as CPU, memory, network, and I/O bandwidth. However, a hardware resource—namely, the processor cache—has been overlooked.

SUMMARY

In a cloud computing environment, a cache and a memory are partitioned into "colors". The colors of the cache and the memory are allocated to a plurality of virtual machines independently of one another. In order to provide cache isolation while allocating the memory and cache in different proportions, some of the colors of the memory are allocated to one or more virtual machines, but these virtual machines are not permitted to directly access these colors. Instead, when a request is received from one of the virtual machines for a memory page in one of the non-accessible colors, a hypervisor swaps the requested memory page with a memory page having a color that the virtual machine is permitted to access. The virtual machine is then permitted to access the requested memory page at the new color location.

In an implementation, a cache is partitioned into a plurality of cache partitions by a computing device. A cache allocation plan for a first entity and a second entity is received by the computing device. The cache allocation plan is independent of a memory allocation plan associated with the first entity and the second entity. A first subset of the cache partitions is allocated to the first entity and a second subset of the cache partitions is allocated to the second entity according to the cache allocation plan by the computing device. The first subset of the cache partitions is greater than the second subset of the cache partitions. The first entity is provided access to the first subset of cache partitions, and the second entity is provided access to the second subset of the cache partitions by the computing device.

In an implementation, a first subset of a plurality of cache partitions is allocated to a first entity, and a second subset of a plurality of cache partitions is allocated to a second entity according to a cache allocation plan by a computing device. A first subset of a plurality of memory partitions is allocated to the first entity, a second subset of the memory partitions is allocated to the second entity, and a third subset of the memory partitions is allocated to the first entity according to a memory allocation plan. The cache allocation plan is independent of the memory allocation plan. The first entity is provided access to the first subset of the cache partitions and the first subset of the memory partitions. The second entity is provided access to the second subset of the cache partitions and the second subset of the memory partitions. An indication of a request to perform a memory operation using a first memory page corresponding to the third subset of the memory partitions from the first entity is received by the computing device. A second memory page corresponding to the first subset of memory partitions is selected. The second memory page is swapped with the first memory page. The memory operation is performed using the second memory page.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
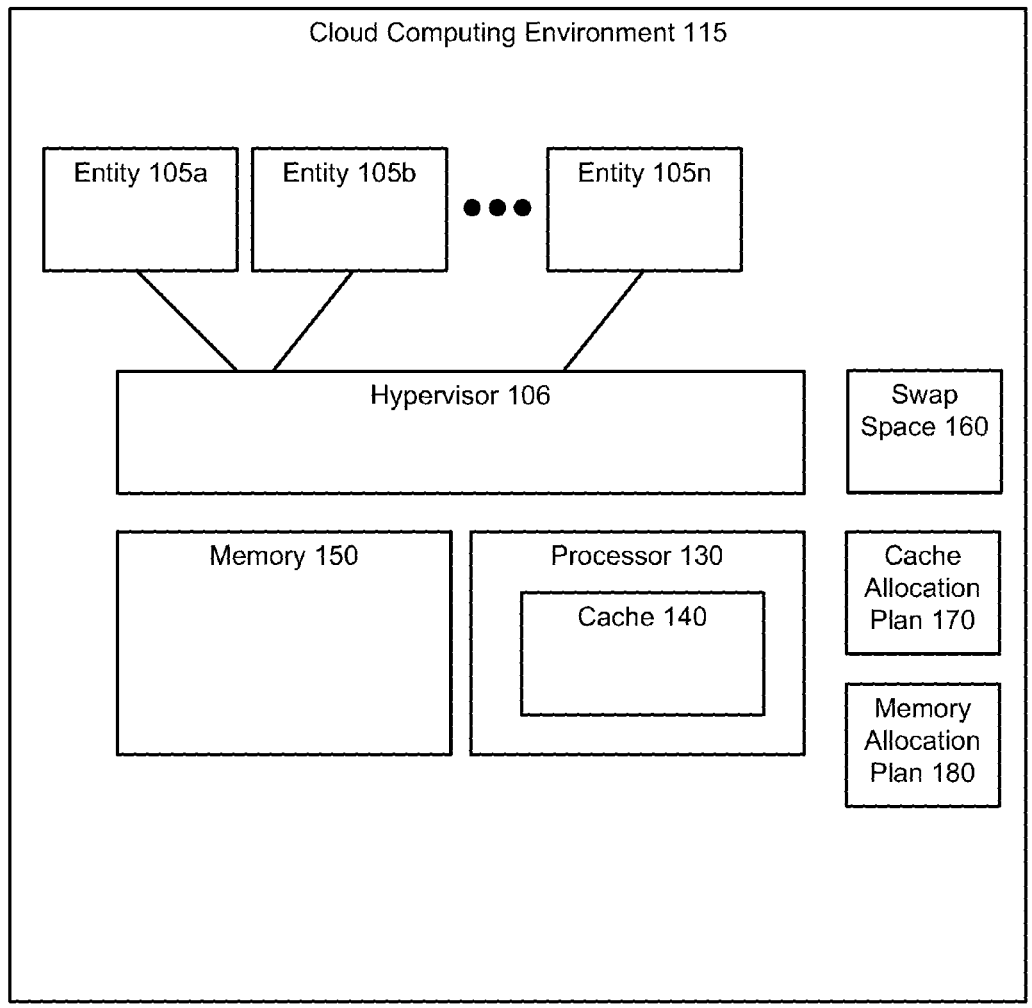
FIG. 1 is an illustration of an example cloud computing environment.

FIG. 1 is an illustration of an example cloud computing environment 115. The cloud computing environment 115 may provide computing and storage services. In particular, the cloud computing environment 115 may execute one or more entities 105a-n. The entities 105a-n may include virtual machines and/or applications, and may each be allotted storage and computing resources by the cloud computing environment 115. The cloud computing environment 115 may be implemented by one or more computing devices such as the computing system 600 described with respect to FIG. 6.

The cloud computing environment 115 may include at least one processor 130 and a memory 150. The at least one processor 130 and the memory 150 may be used by the cloud computing environment 115 to execute the entities 105a-n. The cloud computing environment 115 may further include a hypervisor 106. The hypervisor 106 may control how the entities 105a-n use the computing resources represented by the at least one processor 130 and the memory 150. In addition, the hypervisor 106 may provide virtual memory pages to the entities 105a-n that are mapped to one or more memory pages in the memory 150.

As illustrated, the one or more processors 130 may further include a cache 140. The cache 140 may be a type of memory that is part of the processor(s). The cache 140 may be smaller than the memory 150, but may be of a higher performance than the memory 150, and may offer lower latency than the memory 150 because it is closely integrated into the processor(s).

As may be appreciated, different types of entities 105a-n may have different utility with respect to the cache 140 and the memory 150. For example, an entity that implements a web server may use a large amount of memory 150, but may not be able to take advantage of a large amount of cache 140 because of frequent cache misses due to a large number of files and requests. Similarly, an entity that implements an image processing application may not use as much memory 150 as the web server, but because the image processing application typically performs multiple operations on the same set of image files, the image processing application may be able to take advantage of performance benefits of the cache 140.

Accordingly, in some implementations, the hypervisor 106 may allocate the memory 150 and the cache 140 to the entities 105a-n independently of each other. Thus, an entity 105a may receive a larger amount of the memory 150 than an entity 105b, while the entity 105b may receive a larger amount of cache 140 than the entity 105a. In addition, the hypervisor 106 may provide isolation with respect to the cache 140 and the memory 150, so that an entity cannot read or write to the portions of the memory 150 and/or cache 140 allocated to other entities 105a-n. Similarly, the usage of a portion of the cache 140 allocated to an entity does not affect the performance (i.e., cache misses) experienced by another entity with respect to its portion of the cache 140.

The hypervisor 106 may allocate the cache 140 and the memory 150 according to one or more cache allocation plans and memory allocation plans. The cache allocation plan 170 and the memory allocation plan 180 may include an identifier of each of the entities 105a-n along with a percentage or amount of the cache 140 and/or the memory 150 that is allocated to that entity. In some implementations, the cache allocation plan 170 and the memory allocation plan 180 are received by the hypervisor 106 and may have been generated by an administrator associated with the cloud computing environment 115.

In other implementations, the cache allocation plan 170 and/or the memory allocation plan 180 may be generated by the hypervisor 106 based on one or more cache 140 and/or memory 150 allocation requests received from the entities 105a-n. For example, the entity 105a may request a high percentage of the cache 140, and the entity 105b may request a high percentage of the memory 150. The hypervisor 106 may generate a cache allocation plan 170 and a memory allocation plan 180 that allocate a high percentage of the cache 140 to the entity 105a and a high percentage of the memory 150 to the entity 105b. When there is conflict with the amount of memory 150 and/or cache 140 requested by the entities 150a-n, the hypervisor 106 may generate the cache allocation plans and the memory allocation plans based on priorities associated with each of the entities 150a-n.

Figure 3:
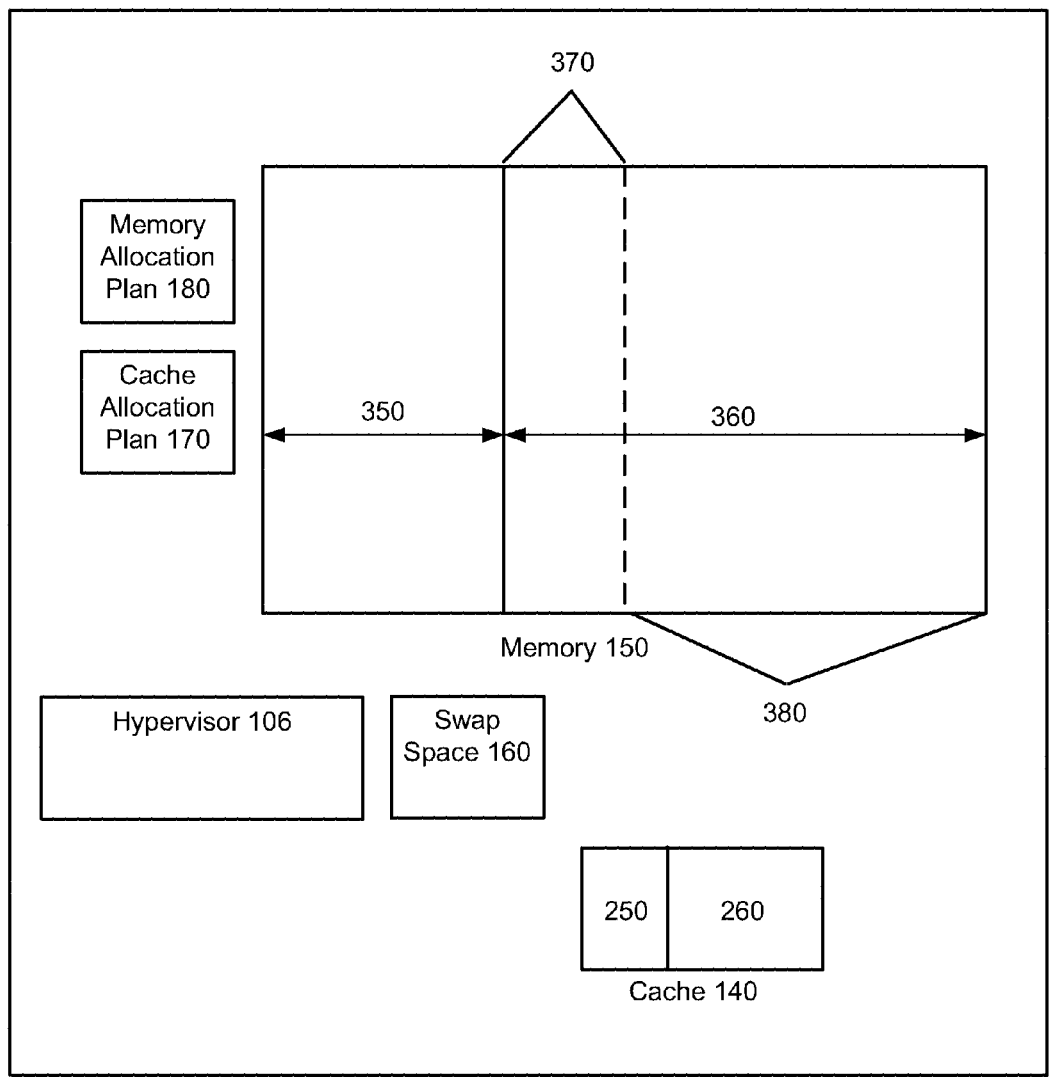
FIG. 3 is an illustration of a hypervisor that disentangles the allocation of the memory from the allocation of the cache.

As described further with respect to FIG. 3, the hypervisor 106 may further include a swap space 160. The swap space 160 may comprise a portion of memory reserved for, and only accessible by, the hypervisor 106. The swap space 160 may be used by the hypervisor 106 to store or "swap" pages of memory from the memory 150, and may allow the hypervisor 106 to assign more virtual memory pages to the entities 105a-n than there are available pages in the memory 150, for example.

Figure 2:
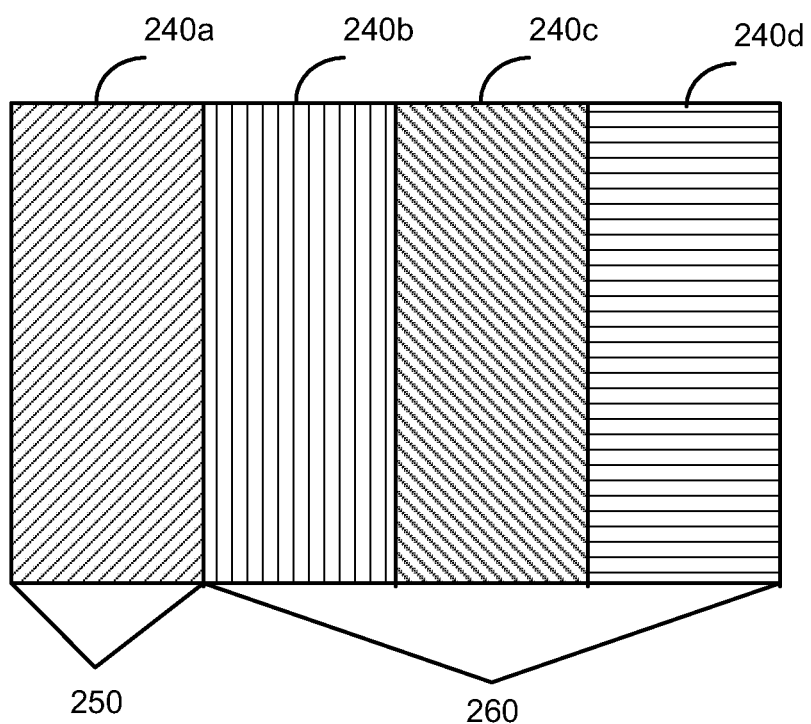
FIG. 2 is an illustration of a cache partitioned into a plurality of colors.

FIG. 2 is an illustration of how the hypervisor 106 may divide the cache 140 into a plurality of partitions. The cache 140 comprises a plurality of pages. Each page in the cache 140 has an associated address. The hypervisor 106 may divide the pages into the plurality of partitions based on the addresses associated with each page. This method is referred to as cache coloring and each of the plurality of partitions is known as a "color". In some implementations, some set of bits of the address of each page may be designated as the color bits by the hypervisor 106. The hypervisor 106 may read the color bits of the address of a page from the cache 140 and determine the "color" of the page based on the color bits. As a result, consecutive pages in the cache 140 may be partitioned into different "colors", with the color association repeating in the same order cyclically.

The maximum number of colors that the cache 140 can be partitioned into may be determined by the hypervisor based on the overall size of the cache 140, and the size of the memory pages used by the cache 140. For example, a processor with a 32 MB, 8-way associative L2 cache with a 4 KB page size can support up to 1024 colors.

In some implementations, the hypervisor 106 may assign colors to the entities 105a-n according to the cache allocation plan 170. Thus, if there are twelve colors corresponding to twelve different partitions of the cache 140, and the cache allocation plan indicates that the entity 105a may be assigned one-third of the cache 140 and that the entity 105b may be assigned two-thirds of the cache 140, then the hypervisor 106 may assign the entity 105a four of the colors and may assign the entity 105b eight of the colors.

For example, FIG. 2 illustrates a cache 140 that has been partitioned into four cache partitions 240a, 240b, 240c, and 240d. The color of each partition is illustrated using a different hashing pattern. The hypervisor 106 may have received or generated a cache allocation plan 170 that allocates one-quarter (25%) of the cache 140 to the entity 105a, and three-quarters (75%) of the cache 140 to the entity 105b. Accordingly, the hypervisor 106 has assigned the entity 105a a subset 250 of the cache that includes the partition 240a, and the entity 105b a subset 260 of the cache 140 that includes the partitions 240b, 240c, and 240d.

While the above described technique for allocating cache partitions to the entities 105a-n according to the cache allocation plan 170 is effective in efficiently utilizing the available cache 140, such a technique may also result in memory partitions of the memory 150 being allocated to the entities 105a-n using a substantially similar ratio as the cache 140. Because virtual memory addresses corresponding to the memory 150 may be mapped to cache 140 addresses, and one of the entities 105a-n cannot be permitted to access or read from the same cache partitions as another of the entities 105a-n, each of the entities 105a-n may be allocated the partitions of the memory 150 that are mapped to the cache partitions that have already been allocated to the entities 105a-n. As described above, depending on the applications implemented by the entities 105a-n, each entity 105a-n may have different cache 140 and memory 150 utilization characteristics. Thus, allocating cache 140 and memory 150 to the entities 105a-n in the same ratios may be undesirable.

Accordingly, in some implementations, the hypervisor 106 may disentangle the allocation of the memory 150 and the cache 140 by reclaiming some of the memory partitions allocated to an entity that is in excess of a memory allocation plan 180. The reclaimed memory partitions may be allocated to a different entity, but because the different entity cannot directly access the reclaimed memory partitions without violating the integrity of the cache 140, the swap space 160 may be used by the hypervisor 106 to swap pages of the reclaimed memory with the memory pages that can be accessed by the different entity before the different entity accesses the swapped pages.

FIG. 3 is an illustration of a hypervisor 106 that disentangles the allocation of the memory 150 from the cache 140. As illustrated, the hypervisor 106 has allocated the cache 140 according to a cache allocation plan 170 that allocates one-third of the cache 140 to the entity 105a and two-thirds of the cache 140 to the entity 105b. In the example shown, the entity 105a has been allocated the subset 250 of the cache 140 and the entity 105b has been allocated the subset 260 of the cache 140. Each subset includes a plurality of cache partitions (i.e., colors).

Using an allocation of the memory 150 that corresponds to the above described allocation of the cache 140, the hypervisor 106 would allocate a subset 350 of the memory 150 to the entity 105a, and a subset 360 of the memory 150 to the entity 105b. As illustrated, the subset 350 is approximately one-third of the memory 150 and the subset 360 is approximately two-thirds of the memory 150. However, in this example, the memory allocation plan 180 may indicate the entity 105a and the entity 105b are each to be allocated half of the memory 150.

In order to disentangle the allocation of the memory 150 from the cache 140, the hypervisor 106 may carve out or deallocate some of the memory partitions of the subset 360 to create a subset 370. The size of the subset 370 may be based on the memory allocation plan 180. The subset 360 reduced by the subset 370 is illustrated in the FIG. 3 as a subset 380. The hypervisor 106 may then allocate the subset 350 and the subset 370 to the entity 105a, and the subset 380 to the entity 105b, which as can be seen in FIG. 3 approximately corresponds to the half (i.e., 50 percent) to each entity allocation indicated by the memory allocation plan 180.

The hypervisor 106 may provide the entity 105a access to the subset 250, and may provide the entity 105b access to the subset 260. The hypervisor 106 may provide the entity 105a access to the subset 350, and may provide the entity 105b access to the subset 380. However, because the subset 370 is mapped to the subset 260 of the cache 140 that is allocated to the entity 105b, the hypervisor 106 may not provide the entity 105a access to the subset 370 without compromising the isolation of the cache 140 with respect to the entity 105b.

Accordingly, to allow the entity 105a to use the subset 370 of the memory 150, the hypervisor 106 may swap memory pages between the subset 370 and the subset 350 using the swap space 160 as an intermediary. When the entity 105a attempts to access a memory page in the subset 370 to perform a memory operation, a page fault may be generated by the operating system which gives control to the hypervisor 106 along with an indication of the requested memory operation. The hypervisor 106 may then select a memory page from a subset of the memory 150 that the entity 105a may access (i.e., the subset 350). The hypervisor 106 may then swap the selected memory page from the subset 350 with the memory page from the subset 370 that the entity 105a was trying to access. The hypervisor 106 may allow the entity 105a to access the swapped memory page in the subset 350. The hypervisor 106 may reverse the swap after the entity 105a completes the access, or may wait to reverse the swap until the entity 105a requests access to the swapped out memory page.

In some implementations, the hypervisor 106 may maintain a data structure, such as a table, that the hypervisor 106 may use to keep track of which memory pages have been swapped between the subset 370 and the subset 350. The hypervisor 106 may further maintain "hotness" data regarding the memory pages in the subset 370. The hotness of a page is measure of how popular or frequently accessed the page is, and may be used by the hypervisor 106 to determine which memory pages may be copied to disk if the subset 370 becomes full. A hot memory page is popular, and therefore likely to be accessed again.

As described above, when a request to access a memory page in the subset 370 is received, the hypervisor 106 selects a memory page from the subset 350 to swap with the requested memory page. In some implementations, the hypervisor 106 may randomly select a memory page from the subset 350 to swap. Alternatively, or additionally, the hypervisor 106 may start at the beginning, end, or other location in the subset 350, and may sequentially select a memory page to swap. However, these methods may inadvertently select a hot memory page from the subset 350 to swap, which may cause minor page faults or may cause the hypervisor 106 to quickly reverse the swap if the hot memory page is subsequently requested. Thus, the hypervisor 106 may attempt to select the memory pages from the subset 350 that are not hot (i.e., cold) to swap.

In some implementations, the hypervisor 106 may determine cold pages to swap by loading a module into one or more of the entities 105a-n. The module may pass hints to the hypervisor 106 that may be used to determine which memory pages are likely to be cold memory pages. For example, in one implementation, the module may put pressure on an entity to move memory pages to disk. The pressure may cause the entity to identify cold memory pages as candidate memory pages to move. The candidate pages may be identified to the hypervisor 106 by the module, and the hypervisor 106 may use the identified candidate pages to select a page to swap. Other methods to select cold memory pages may be used.

Figure 4:
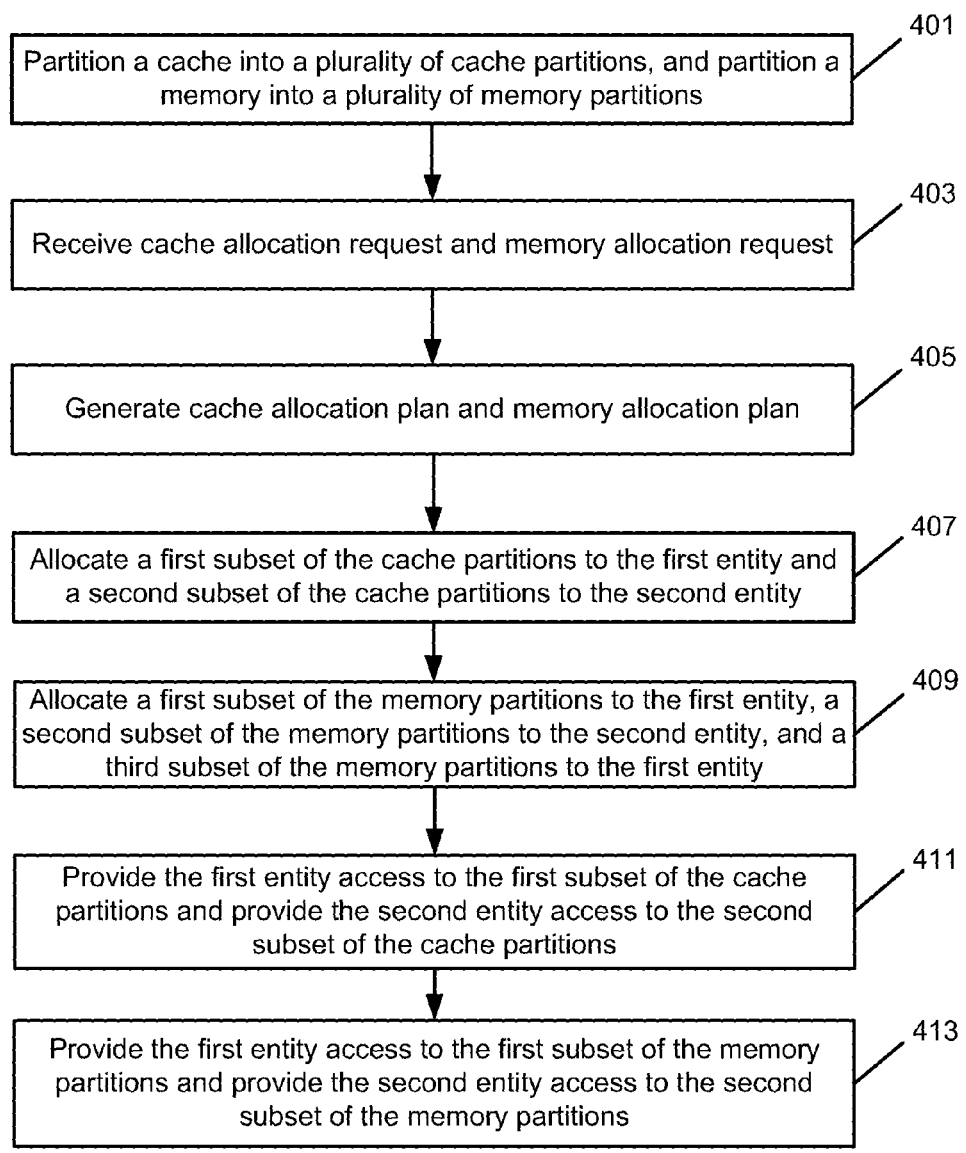
FIG. 4 is an operational flow of an implementation of a method for partitioning and providing access to a cache and a memory.

FIG. 4 is an operational flow of an implementation of a method 400 for partitioning and providing access to a cache and a memory. The method 400 may be implemented by a hypervisor 106.

A cache and a memory are partitioned at 401. The cache 140 and the memory 150 may be partitioned by the hypervisor 106 into a plurality of cache partitions and a plurality of memory partitions, respectively. In some implementations, each partition may be associated with a color. The number of colors may be dependent on the granularity and size of the cache 140. Partitioning the cache into a plurality of cache partitions may include determining a color for each of a plurality of pages of the cache and partitioning each of the plurality of pages into one of the plurality of cache partitions based on the determined color. The memory may be partitioned based on cache partitions.

A cache allocation request and a memory allocation request are received at 403. The cache allocation request(s) and/or the memory allocation request(s) may be received by the hypervisor 106 from a first entity 105a and a second entity 105b. Each of the entities 105a and 105b may be one or more of a virtual machine or an application. The cache request(s) and/or memory request(s) may specify an amount or percentage of the cache 140 and/or memory 150. Alternatively, the cache request(s) and/or memory request(s) may specify whether an entity is an efficient user of the cache 140 and/or the memory 150.

A cache allocation plan and a memory allocation plan are generated at 405. The cache allocation plan 170 and the memory allocation plan 180 may be generated by the hypervisor 106 from the cache allocation request(s) and/or memory allocation request(s). The cache allocation plan 170 may specify the number of colors or partitions of the cache 140 that may be allocated to each of the first entity 105a and the second entity 105b. Similarly, the memory allocation plan 180 may specify the number of colors or partitions of the memory 150 that may be allocated to each of the first entity 105a and the second entity 105b. The memory allocation plan 180 may be independent of the cache allocation plan 170. The hypervisor 106 may attempt to honor the received requests, but may consider priority information associated with the entities 105a and 105b if one or more of the requests conflict. In some implementations, the cache allocation plan 170 may specify that the first entity 105a may be allocated less of the cache 140 than the second entity 105b, and the memory allocation plan 180 may specify that the second entity 105b may be allocated less of the memory 150 than the first entity 105a.

A first subset of the cache partitions is allocated to the first entity and a second subset of the cache partitions is allocated to the second entity at 407. The first subset and the second subset of the cache partitions may be allocated by the hypervisor 106 according to the cache allocation plan 170. The first entity 105a may be allocated less of the cache 140 than the second entity 105b, and the first subset may include fewer partitions or colors than the second subset.

A first subset of the memory partitions is allocated to the first entity, a second subset of the memory partitions is allocated to the second entity, and a third subset of the memory partitions is allocated to the first entity at 409. The first subset, second subset, and the third subset of the memory partitions may be allocated by the hypervisor 106 according to the memory allocation plan 180. The third subset may correspond to memory 150 that would have been allocated to the entity 105b in addition to the second subset based on the amount of the cache 140 that was allocated to the entity 105b.

The first entity is provided access to the first subset of the cache partitions and the second entity is provided access to the second subset of the cache partitions at 411. The access may be provided by the hypervisor 106.

The first entity is provided access to the first subset of the memory partitions, and the second entity is provided access to the second subset of the memory partitions at 413. The access may be provided by the hypervisor 106. Because the third subset is mapped to the second subset of cache partitions, the hypervisor 106 cannot provide the first entity 105a access to the third partition without violating cache isolation. As a result, the hypervisor 106 may swap memory pages from the third subset with memory pages from the first subset when the first entity 105a attempts to access the third partition to perform one or more memory operations. An implementation of this is described further with respect to FIG. 5.

Figure 5:
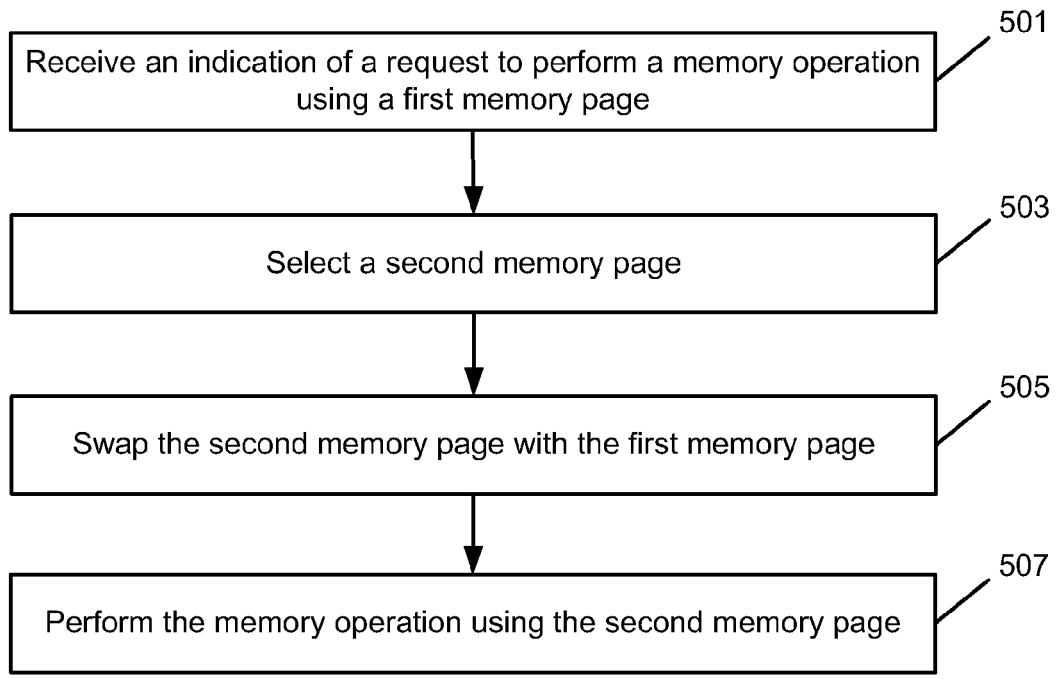
FIG. 5 is an operational flow of an implementation of a method for performing a memory operation using a swapped memory page.

FIG. 5 is an operational flow of an implementation of a method 500 for performing a memory operation using a swapped memory page. The method 500 may be implemented by the hypervisor 106.

An indication of a request to perform a memory operation using a first memory page is received at 501. The indication may be received by the hypervisor 106 as a result of a page fault, for example. The first memory page may correspond to the subset of the memory partitions that were allocated to an entity 105a by the hypervisor 106, but because the memory page maps to a region of the cache 140 that the entity 105a may not access, a page fault was generated when the entity 105a attempted to access the first memory page to perform the memory operation. The memory operation may include a variety of memory operations such as a read operation or a write operation.

A second memory page is selected at 503. The second memory page may be selected by the hypervisor 106. The second memory page may be selected from the subset of the memory partitions that the entity 105a is permitted to access. In some implementations, the second memory page is randomly selected. In other implementations, a cold memory page or a least cold memory page is selected from the subset of the memory partitions that entity 105a is permitted to access.

The second memory page is swapped with the first memory page at 505. The second memory page may be swapped with the first memory page by the hypervisor 106. In some implementations, the hypervisor 106 may swap the first and second memory pages by copying the first memory page to the swap space 160. The second memory page may then be copied to the address where the first memory page was stored. The first memory page may then be copied from the swap space 160 to the address where the second memory page was stored. Alternately, to save the cost of a memory copy, the first memory page address may be removed from the swap space while adding the second memory page address to the swap space. In addition, a data structure may be updated to reflect the swapping of the first memory page and the second memory page.

The memory operation is performed using the second memory page at 507. The memory operation may be performed by the entity 105a and/or the hypervisor 106. After the memory operation is performed, the hypervisor 106 may reverse the swap of the first memory page and the second memory page. Alternatively, the hypervisor 106 may reverse the swap when a memory operation is received for the second memory page.

Figure 6:
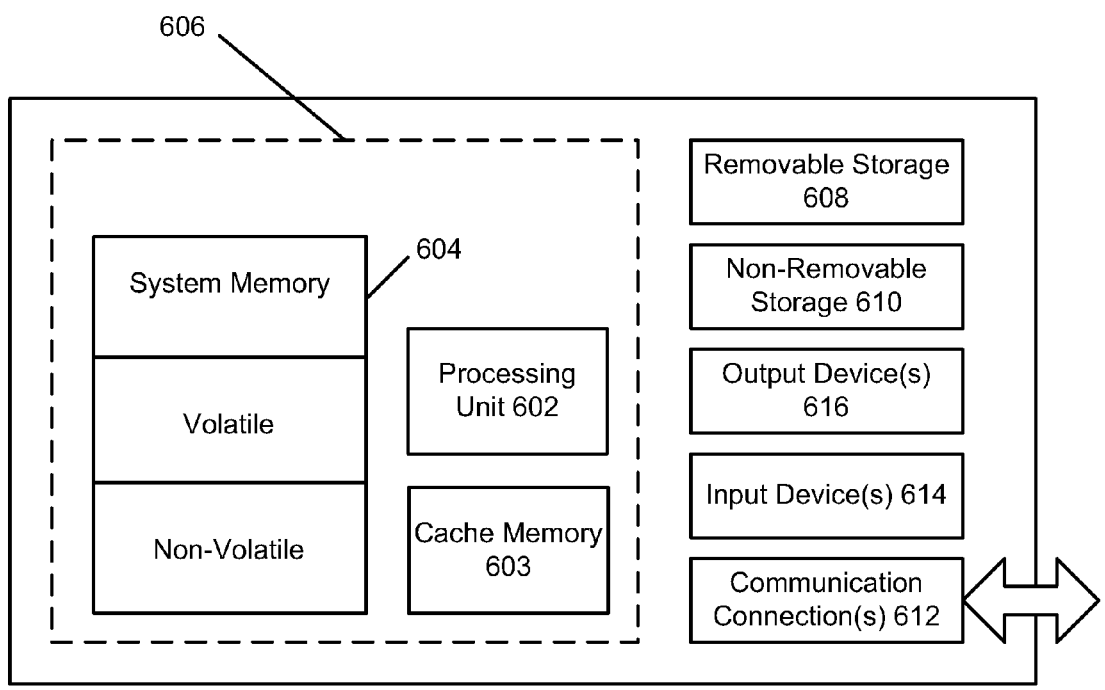
FIG. 6 shows an exemplary computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing system 600. In its most basic configuration, computing system 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

The computing system 600 may further include a cache memory 603. The cache memory 603 is typically faster than the memory 604, and is more closely integrated into the at least one processing unit 602 than the system memory 604. Data is copied from the system memory 604 to the cache 603 when the data is processed and/or read by the at least one processing unit.

Computing system 600 may have additional features/functionality. For example, computing system 600 may include additional storage (removable and/or non-removable) including, but not limited to, magnetic or optical disks or tape. Such additional storage is illustrated in FIG. 6 by removable storage 608 and non-removable storage 610.

Computing system 600 typically includes a variety of computer readable media. Computer readable media can be any available media that can be accessed by computing system 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 600. Any such computer storage media may be part of computing system 600.

Computing system 600 may contain communications connection(s) 612 that allow the device to communicate with other devices. Computing system 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    partitioning a cache into a plurality of cache partitions by a computing device, wherein the cache is part of a processor of the computing device and is separate from a memory associated with the computing device;
    receiving a cache allocation plan for a first entity and a second entity by the computing device, wherein the cache allocation plan is for the cache and is independent of a memory allocation plan for the memory that is associated with the first entity and the second entity;
    allocating a first subset of the plurality of cache partitions to the first entity, and a second subset of the plurality of cache partitions to the second entity according to the cache allocation plan by the computing device, wherein the first subset of the plurality of the cache partitions is greater than the second subset of the plurality of cache partitions, and wherein an amount of the cache that is allocated to the first entity is independent of an amount of the memory that is allocated to the first entity;
    allocating a first subset of a plurality of memory partitions of the memory to the first entity, and a second subset of the plurality of memory partitions to the second entity according to the memory allocation plan by the computing device, wherein the second subset of the plurality of memory partitions is greater than the first subset of the plurality of memory partitions, and wherein the second subset of the plurality of memory partitions is mapped to the first subset of the plurality of cache partitions; and
    providing the first entity access to the first subset of the plurality of cache partitions and providing the second entity access to the second subset of the plurality of cache partitions by the computing device.

2. The method of claim 1, wherein each cache partition is associated with a color, and partitioning the cache into a plurality of cache partitions comprises determining a color for each of a plurality of pages of the cache and partitioning each of the plurality of pages into one of the plurality of cache partitions based on the determined color.

3. The method of claim 1, wherein the first and second entities are one or more of a virtual machine or an application.

4. The method of claim 1, further comprising partitioning the memory into the plurality of memory partitions.

5. A method comprising:
    allocating a first subset of a plurality of cache partitions of a cache to a first entity and allocating a second subset of a plurality of cache partitions of the cache to a second entity according to a cache allocation plan by a computing device, wherein the cache is part of a processor of the computing device and is separate from a memory associated with the computing device;
    allocating a first subset of a plurality of memory partitions of the memory to the first entity, a second subset of the plurality of memory partitions of the memory to the second entity, and a third subset of the plurality of memory partitions of the memory to the first entity according to a memory allocation plan by the computing device, wherein the cache allocation plan is independent of the memory allocation plan and an amount of the memory allocated to the first entity is independent of an amount of the cache allocated to the first entity;
    providing the first entity access to the first subset of the plurality of cache partitions and the first subset of the plurality of memory partitions by the computing device;

providing the second entity access to the second subset of the plurality of cache partitions, and the second subset of the plurality of memory partitions by the computing device, wherein the third subset of the plurality of memory partitions is mapped to the second subset of the plurality of cache partitions;

providing the first entity access to the allocated first subset of the plurality of memory partitions of the memory while not providing the first entity access to the allocated third subset of the plurality of memory partitions by the computing device;

receiving an indication of request to perform a memory operation using a first memory page corresponding to the third subset of the memory partitions from the first entity by the computing device;

selecting a second memory page corresponding to the first subset of memory partitions by the computing device;

swapping the second memory page with the first memory page by the computing device; and performing the memory operation using the second memory page by the computing device.

6. The method of claim 5, wherein each cache partition is associated with a color, and each cache partition comprises a plurality of pages of the associated color.

7. The method of claim 5, wherein the first and second entities are one or more of a virtual machine or an application.

8. The method of claim 5, wherein selecting the second memory page corresponding to the first subset of memory partitions comprises randomly selecting a memory page from a plurality of memory pages corresponding to the first subset of memory partitions.

9. The method of claim 5, wherein selecting the second memory page corresponding to the first subset of memory partitions comprises selecting a cold memory page from a plurality of memory pages corresponding to the first subset of memory partitions.

10. The method of claim 5, wherein swapping the second memory page with the first memory page comprises:
copying data from the second memory page to a swap space; and
copying data from the first memory page to the second memory page.

11. The method of claim 5, wherein the memory operation is one or more of a read operation or a write operation.

12. A system comprising:
a computing device comprising a memory and a cache, wherein the cache is part of a processor of the computing device and is separate from the memory;
a first entity;
a second entity; and
a hypervisor adapted to:
receive a cache allocation request from the first entity;
generate a cache allocation plan according to the cache allocation request;
receive a memory allocation request from the first entity;
generate a memory allocation plan according to the memory allocation request, wherein the memory allocation plan is independent of the cache allocation plan;
partition the cache into a plurality of cache partitions;
partition the memory into a plurality of memory partitions;
allocate a first subset of the plurality of cache partitions to the first entity and allocate a second subset of the plurality of cache partitions to the second entity according to the cache allocation plan, wherein an amount of the cache that is allocated to the first entity is independent of an amount of the memory that is allocated to the first entity;
allocate a first subset of a plurality of memory partitions to the first entity, a second subset of the plurality of memory partitions to the second entity, and a third subset of the plurality of memory partitions to the first entity according to the memory allocation plan, wherein the third subset of the plurality of memory partitions is mapped to the second subset of the plurality of cache partitions;
provide the first entity access to the first subset of the plurality of cache partitions, and the first subset of the plurality of memory partitions while not providing the first entity access to the allocated third subset of the plurality of memory partitions; and
provide the second entity access to the second subset of the plurality of cache partitions, and the second subset of the plurality of memory partitions.

13. The system of claim 12, wherein the hypervisor is further adapted to:
receive an indication of request to perform a memory operation using a first memory page corresponding to the third subset of the memory partitions from the first entity;
select a second memory page corresponding to the first subset of memory partitions;
swap the second memory page with the first memory page; and
perform the memory operation using the second memory page.

14. The system of claim 13, wherein the hypervisor adapted to swap the second memory page with the first memory page comprises the hypervisor adapted to:
copy data from the second memory page to a swap space; and
copy data from the first memory page to the second memory page.

15. The system of claim 13, wherein selecting the second memory page corresponding to the first subset of memory partitions comprises randomly selecting a memory page from a plurality of memory pages corresponding to the first subset of memory partitions.

16. The system of claim 13, wherein selecting the second memory page corresponding to the first subset of memory partitions comprises selecting a cold memory page from a plurality of memory pages corresponding to the first subset of memory partitions.

17. The system of claim 12, wherein the first and second entities are one or more of a virtual machine or an application.

18. The system of claim 12, wherein each cache partition is associated with a color, and wherein the hypervisor adapted to partition the cache into a plurality of cache partitions comprises the hypervisor adapted to:
determine a color for each of a plurality of pages of the cache; and
partition each of the plurality of pages into one of the plurality of cache partitions based on the determined color.

* * * * *